United States Patent
Schaefer et al.

(10) Patent No.: US 6,698,475 B2
(45) Date of Patent: Mar. 2, 2004

(54) FUEL TANK

(75) Inventors: Thomas Schaefer, Bonn (DE); Holger Woblick, Bonn (DE); Horst Hildebrand, Moor am See (DE)

(73) Assignee: Kautex Textron GmbH & Co. KG, Bonn (DE)

(*) Notice: Subject to any disclaimer, the term of this patent is extended or adjusted under 35 U.S.C. 154(b) by 99 days.

(21) Appl. No.: 10/022,979

(22) Filed: Dec. 13, 2001

(65) Prior Publication Data

US 2002/0074059 A1 Jun. 20, 2002

(30) Foreign Application Priority Data

Dec. 19, 2000 (DE) .......................................... 100 63 414

(51) Int. Cl.$^7$ .............................. B65B 1/04; B65B 3/04; B67C 3/00
(52) U.S. Cl. .......................... 141/325; 141/59; 137/588; 123/519
(58) Field of Search .............................. 141/44–46, 59, 141/286, 301, 302, 312, 325, 346–354; 137/587–589, 289; 55/385.3, 385.4; 220/86.2, DIG. 33; 123/519

(56) References Cited

U.S. PATENT DOCUMENTS

| | | | | |
|---|---|---|---|---|
| 4,877,146 A | * | 10/1989 | Harris | .......................... 220/746 |
| 5,056,570 A | * | 10/1991 | Harris et al. | ................... 141/59 |
| 6,273,070 B1 | * | 8/2001 | Arnal et al. | ................. 123/519 |

\* cited by examiner

*Primary Examiner*—Timothy L. Maust
(74) *Attorney, Agent, or Firm*—Grossman, Tucker, Perreault & Pfleger, PLLC

(57) ABSTRACT

A fuel tank for a motor vehicle comprises at least one fuel filling opening, at least one fuel delivery pump, at least one operational vent and at least one refueling vent valve. The vent and vent valve are connected to a fuel vapor filter by way of at least one vent conduit. At least one bead removal container is connected on the upstream side of the fuel vapor filter. At least one bead removal container and the refueling vent valve are combined to form a functional unit in the form of a vent unit adapted to fit into an opening through the wall of the tank.

19 Claims, 2 Drawing Sheets

FUEL TANK

FIELD OF THE INVENTION

The invention concerns a fuel tank and more particularly a fuel tank for a motor vehicle.

BACKGROUND OF THE INVENTION

A typical form of fuel tank for a motor vehicle comprises a filling opening for introducing fuel into the tank in a refuelling procedure, at least one fuel delivery pump to feed fuel from the fuel tank to the engine of the motor vehicle, and at least one operational vent means and at least one refuelling vent means.

It will be noted in that respect at this point that the term operational vent means is used herein to denote a vent means for venting the fuel tank during operation of the vehicle, for venting fuel vapor for example from the tank due to fluctuations in temperature or caused by swirl or surge movements of the fuel in the fuel tank in response to dynamic movement of the motor vehicle in which the fuel is disposed. The term refuelling vent means is used herein to denote a vent means operative to vent the tank upon a tank filling or refuelling procedure.

The vent means are connected to a fuel vapor filter by way of at least one vent line while connected upstream of the fuel vapor filter is at least one bead removal container for removing liquid beads or droplets of fuel from the fuel vapors carried in the vent line.

It will be appreciated that fuel tanks of the above-indicated general configuration which nowadays are usually formed in one or more pieces from plastic material are systems which are optimised in terms of hydrocarbon emissions. As is known, certain plastic materials, for example polyethylene, are permeable in relation to hydrocarbons. For that reason, fuel tanks of plastic material are often of a multi-wall configuration or are made from multi-layer extrudates with incorporated barrier layers for hydrocarbons to prevent diffusion thereof through the wall of the tank to the surrounding atmosphere. It is in the meantime possible for fuel tanks of plastic material for hydrocarbon fuels to be designed in such a way as to be very substantially diffusion-resistant in relation to such fuels. Possible sources of hydrocarbons emissions however are still connecting nipples, valves, hoses, fitting openings and the like on or in the tank wall. It will be appreciated that lines and conduits going to and from the fuel tank also constitute possible sources of fuel emission. It is therefore desirable for as few connections and like components to be provided on a fuel tank and for as many other units of equipment which are required to ensure a supply of fuel to an internal combustion engine of a motor vehicle to be disposed in the interior of the fuel tank.

It will further be appreciated that manufacturing and assembly costs for fuel tanks and fuel feed systems which are optimised in terms of fuel emissions are to be kept within reasonable limits, either in the case of fuel tanks of plastic material which are made in one or more parts or in the case of fuel tanks of metal which are similarly made up of a plurality of parts.

In the case of multi-part fuel tanks comprising two or more casing portions, arranging a large part of the lines and other units of equipment for providing for the supply of fuel to the motor vehicle engine in the interior of the fuel tank and fixing them therein will involve a comparatively low level of assembly expenditure. That however is a more difficult proposition in the case of one-piece plastic fuel tanks which are formed by extrusion blow molding. In the case of such a fuel tank the body of the tank has to be blow-molded in part around the installation units in the procedure for producing the tank or the installation units have to be subsequently fitted into the tank through fitting openings which are to be subsequently gas-tightly closed.

Although the installation units of the fuel tank and the fuel supply system which is to be provided thereon are to be designed to last the service life of the fuel tank, it is nonetheless often desirable to reduce the number of components used and to make some components such as for example the fuel pump or a suitable fuel delivery unit interchangeable for repair or maintenance purposes.

SUMMARY OF THE INVENTION

An object of the present invention is to provide a fuel tank for a motor vehicle, which is improved in terms of its emission values, while further being simplified in respect of its structure.

Another object of the invention is to provide a motor vehicle fuel tank which involves a reduction in connecting locations and like units which are liable to constitute a source of emission from the tank.

Still another object of the present invention is to provide a fuel tank so designed that a significant proportion of connections thereon are moved into the tank so as to make a considerable contribution to reducing possible hydrocarbon emissions therefrom.

Still a further object of the present invention is to provide a motor vehicle fuel tank which affords enhanced ease of replaceability of fuel tank components which are liable to require repair and/or maintenance.

In accordance with the principles of the present invention the foregoing and other objects are attained by a fuel tank for a motor vehicle, comprising at least one filling opening, at least one fuel delivery pump, at least one operational vent means and at least one refuelling vent means. The vent means are connected by way of at least one vent line to a fuel vapor filter. Connected upstream of the fuel vapor filter is at least one bead removal container. At least the bead removal container and the refuelling vent means are combined to form a functional unit in the form of a vent unit.

As will be seen in greater detail from an embodiment of a fuel tank in accordance with the present invention as described hereinafter combining a plurality of components of the vent system of the fuel tank to constitute a unit can simplify assembly of the tank and minimise the number of connections of the entire vent system. If the fuel tank is made from plastic material, which is the preferred option here, the vent unit provided in accordance with the invention can contribute to reducing the number of connecting locations and weld locations involved in the vent system. A further advantage of this arrangement is that this involves a significant number of the connecting locations involved in the assembly being moved into the tank, which makes a quite considerable contribution to reducing hydrocarbon emissions.

In a preferred feature of the invention the vent unit is arranged overall releasably and interchangeably in the fuel tank. In that way, if the vent unit has for example a defective valve, it can be quite readily replaced or repaired. In a further preferred feature the vent unit can be in the form of an insert which is adapted to close a fitting opening in the wall of the fuel tank.

The vent unit can be for example in the form of a cover closure which is sealed with a cover flange in relation to the tank wall. The cover flange can then be welded to the tank wall. Alternatively, it can be provided that the cover flange is braced in relation to the tank wall by means of a union nut, with the interposition of one or more seals. In that case, a suitable screwthreaded connecting portion or an additional screwthreaded ring is to be provided in or on the tank wall.

It will be appreciated that both the fuel feed afforded by the fuel delivery system to the motor vehicle engine and possibly the return therefrom can be taken through the above-mentioned cover closure of the vent unit. It may also accommodate cable ducting means for the fuel delivery pump, a sender such as a fuel level sensor and the like. This affords the advantage that it is possible to save on an additional cover closure and an additional fitting opening for the fuel delivery unit, whereby the number of openings in a diffusion-tight tank wall can also be reduced. In that case the fuel delivery unit can be fitted into the fuel tank through the fitting opening for the vent unit.

In a further preferred feature of the invention the cover closure is in the form of a carrier means for the vent unit.

In a further preferred feature of the invention the fuel tank includes at least one roll-over valve in the vent unit, more preferably disposed in the immediate proximity of the cover closure. In the installation position of the tank, the roll-over valve would be arranged approximately in the upper third of the bead removal container adjoining the cover closure.

In still another preferred feature of the invention at least one safety pressure relief valve can be disposed in the vent unit, operable to permit emergency venting of the fuel tank when the operational vent means and the refuelling vent means are closed. Such a safety valve for example prevents an excessively increased pressure from building up in the fuel tank in the case of the tank being overfilled. It is therefore appropriate for the safety valve to be provided on the vent unit in such a way that the safety valve is disposed in the gas phase in the fuel tank, when the vehicle is in any reasonably possible inclined position.

Preferably, there are a plurality of operational vent means which are connected to the vent unit by way of a common vent conduit or a plurality of vent conduits. The vent unit thus also serves to bring together all the vent ducts from the fuel tank.

The operational vent means can be in the form of operational vent valves with or without a pressure-holding function or alternatively in the form of simple vent nipples.

Desirably, the refuelling vent means is in the form of a refuelling vent valve, but it is also possible to provide a shut-off valve in the filler pipe of the fuel tank, to actuate a shut-off mechanism of a refuelling gun in order thereby to terminate a refuelling procedure, so that the refuelling vent means does not have to involve any shut-off function or any pressure holding function.

A preferred configuration in accordance with this invention however provides that the operational vent means and also the refuelling vent means are in the form of valves. In that case the operational vent means will be such as to close due to actuation by a float when fuel is present thereat. A pressure holding function for the operational vent valve is ensured by a pressure relief valve disposed on the downstream side thereof.

The bead removal container is desirably provided with a labyrinth configuration or with internally disposed baffle walls so that liquid hydrocarbons contained in dispersed form in the fuel vapors can condense out in the bead removal container. The bead removal container is to be provided for the reason that in dynamic operation of the motor vehicle in which the fuel tank of the invention is fitted or when refuelling the motor vehicle, it is not impossible for a mixture of liquid and gaseous fuel to be entrained by way of the vent conduits. It is appropriate to avoid as far as possible liquid hydrocarbons being passed to the fuel vapor filter as that can adversely affect the regeneratability thereof. In general such a fuel vapor filter is in the form of an activated carbon filter which is regenerated by way of the combustion air feed to the engine.

In accordance with the invention it is preferably provided that the refuelling vent valve is arranged immediately beneath the bead removal container or on same at the upstream side thereof. The valve casing surrounding the refuelling vent valve, like the bead removal container, can be provided with labyrinth fitments therein.

As in accordance with the invention the bead removal container can be arranged in the fuel tank, it is not impossible that, when there is a high level of fuel in the tank, there is no or only a slight difference in level between the level of liquid in the bead removal container and the level of fuel in the fuel container. In that case, it is preferable to provide means for actively emptying the bead removal container into the fuel tank against a fall in level or when there is a slight difference in level between the level of fuel in the fuel tank and the level of liquid in the bead removal container. In that case the operational vent means can be in the form of one or more nipples, in which respect it is possible to accept that a certain amount of liquid hydrocarbons passes into the bead removal container by way of the vent means. The volume of the bead removal container can be such that the entrainment of liquid hydrocarbons through the vent conduits into the bead removal container can be tolerated within certain limits.

For the purposes of actively emptying the bead removal container into the fuel tank, it is possible for example to connect a drain conduit thereof to the suction intake side of a pump, for example a suction jet pump. The suction jet pump can be operated in the manner known in relation to such devices, by way of a flow portion of fuel which is branched off the flow of fuel being conveyed to the engine. Alternatively, it is possible for example in the case of a fuel delivery system with a return from the engine, for the suction jet pump to be operated by way of the return flow from the engine. It is preferable to provide an additional suction jet pump for the purposes of actively emptying the bead removal container. Depending on the respective configuration of the fuel tank which can be of a complex structure involving a plurality of filling levels therein, for example in different compartments of the tank, suction jet pumps are often to be provided in any case for emptying various compartments in the tank into the reservoir or swirl pot of a fuel delivery unit of the tank.

Further objects, features and advantages of the invention will be apparent from the description hereinafter of a preferred embodiment of the invention.

DESCRIPTION OF THE PREFERRED EMBODIMENTS

Figure 1:
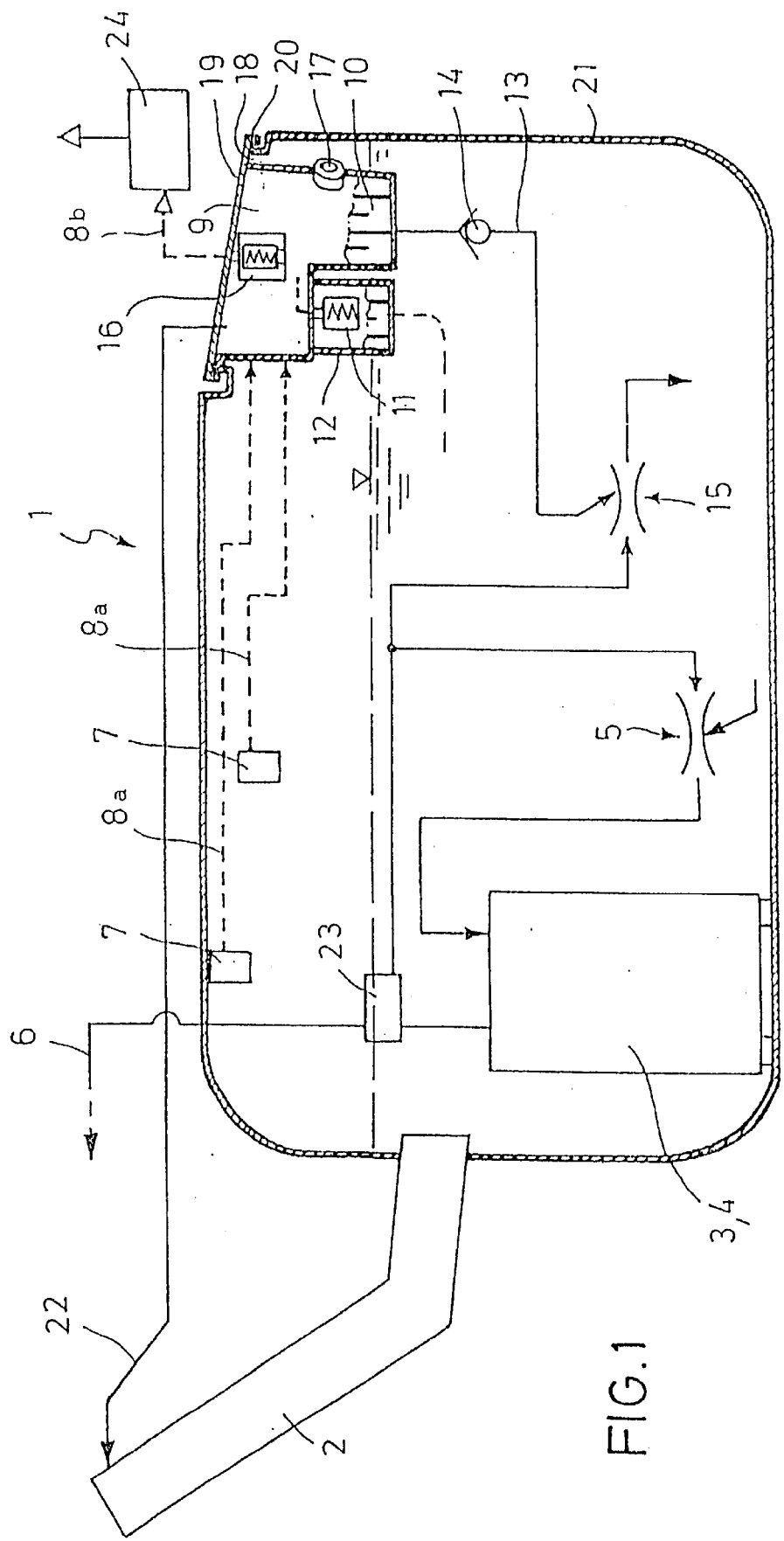
FIG. 1 is a diagrammatic view of a fuel tank according to the invention in operation of a motor vehicle in which the fuel tank is fitted.
Figure 2:
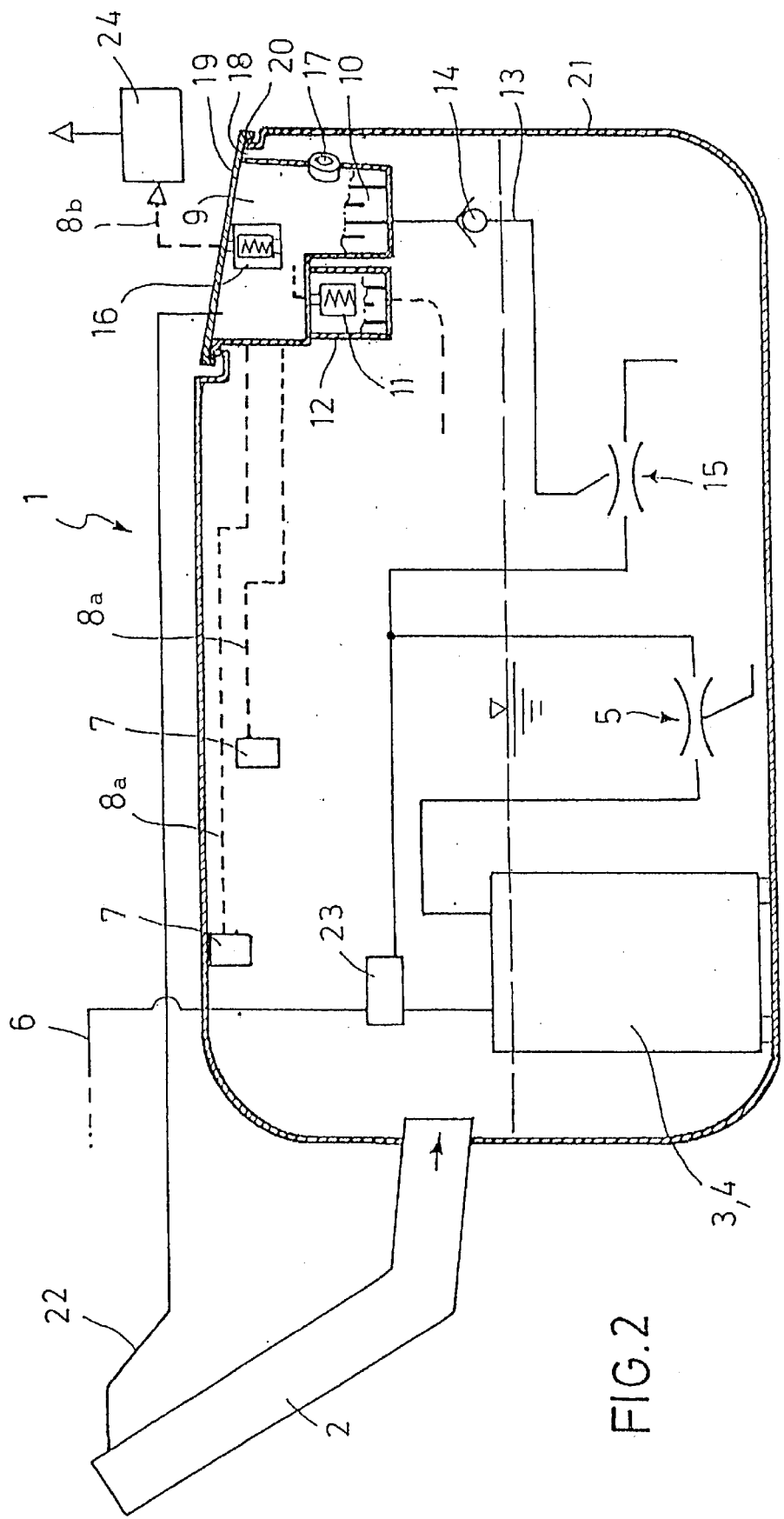
FIG. 2 is a diagrammatic view of the FIG. 1 fuel tank during a refuelling procedure.

Referring generally at this stage to the drawings reference numeral 1 therein denotes a fuel tank which in this embodiment is in the form of a plastic fuel tank produced by extrusion blow molding. It includes a filler pipe or filler connection 2 and a fuel delivery unit 3 disposed in the interior of the fuel tank 1. It will be appreciated that the fuel tank 1 may comprise metal or a plurality of injection-molded casing portions which are suitably assembled to constitute the tank body.

The fuel delivery unit 3 includes a surge or swirl pot diagrammatically indicated at 4 as a fuel reservoir and a delivery pump (not shown) which is arranged therein. Reference numeral 5 denotes a first suction jet pump which is operable during operation of the engine of the motor vehicle to convey fuel from the free volume of the fuel tank into the surge pot 4. From there, the fuel delivery pump which is part of the fuel delivery unit 3 conveys the fuel to the engine of the motor vehicle, by way of a fuel feed which is diagrammatically indicated at 6. It will be noted at this point that the fuel delivery pump can be arranged inside or outside the fuel tank 1, with either of those positions falling within the invention. Arranging the fuel delivery pump within the fuel tank in the manner described and illustrated herein is however the preferred option.

It will be appreciated that a fuel tank requires vent means which on the one hand provide for venting thereof during a tank refuelling procedure, while on the other hand ensuring continuous venting as the fuel in the fuel tank outgasses due for example to an increase in temperature and due to motion dynamics when the motor vehicle in which the fuel tank 1 is installed is moving, causing swirl and surge movements of the fuel in the fuel tank 1. Not least also is the fact that the fuel must be capable of expanding as a result of temperature fluctuations.

To provide for venting of the fuel tank 1 during operational movement of the motor vehicle, this being referred to herein as operational venting, provided in the fuel tank 1 in the region of the wall which is the upper wall thereof in the installation position of the fuel tank 1 is at least one operational vent means as indicated at 7, and preferably, as illustrated, a plurality of such operational vent means. Thus, the drawing diagrammatically shows just two operational vent means 7, but it will be apparent that these can be provided at the most widely varying locations in relation to the fuel tank, as much as possible in the gaseous phase of the fuel, in other words, in the region of the fuel tank which is an upper region in the installation position thereof, in the proximity of the upper wall of the fuel tank. In the illustrated embodiment the operational vent means 7 are in the form of operational vent valves which only respond by opening when there is an increased pressure in the fuel tank 1, but which close, for example under the actuation of a float device, when fuel approaches, caused for example by surge and swirl movements of the fuel in the fuel tank 1. Alternatively it is possible for the operational vent means 7 to be in the form of simple nipples which are connected by way of vent conduits indicated at 8a to a vent unit which is identified generally by reference numeral 9. It will be further appreciated that it is possible to provide both a plurality of vent conduits 8a and also alternatively a common collector vent conduit.

The vent unit 9 includes a bead removal container 10 which has labyrinth-type fitments therein and to which all inwardly disposed vent conduits 8a are connected. A further integral component of the vent unit 9 is a refuelling vent valve 11 which is disposed in a valve chamber 12. The valve chamber 12 is connected directly to the bead removal container 10. In the illustrated embodiment, the valve chamber 12 communicates with the bead removal container 10 by way of the refuelling vent valve 11 which is disposed at an upward position in the valve chamber. The refuelling vent valve 11 is in the form as illustrated of a spring-loaded float valve which is usually open in operation of the vehicle in which the fuel tank 1 is fitted, unless the planned maximum filling level of fuel in the fuel tank 1 is reached. When the level of fuel in the fuel tank 1 rises during the course of a refuelling procedure, the float of the refuelling vent valve 11 is lifted into the closed position so that, in the refuelling procedure, an increased pressure is built up in the fuel tank 1 and causes a refuelling gun valve to be shut off at that stage in the refuelling procedure. As already mentioned above, the operational vent means 7 are desirably in the form of valves which afford a pressure holding function in order ultimately to ensure the rise in pressure within the fuel tank 1 in order to actuate the shut-off mechanism of the refuelling gun in order thereby to terminate the refuelling procedure.

The bead removal container 10 is provided with a drain conduit 13 which opens into the fuel tank 1 and by way of which the bead removal container 10 can be emptied into the fuel tank 1. In order to prevent the fuel from the fuel tank 1 from flowing into the bead removal container 10 by way of the drain conduit 13, a check valve 14 is suitably provided in the drain conduit 13.

In order to guarantee that the bead removal container 10 is still certain to be emptied of fuel when there is a high level of fuel in the fuel tank 1, the drain conduit 13 is connected to the suction intake side of a second suction jet pump 15. Although the structure and mode of operation of a suction jet pump such as those indicated at 5 and 15 in the drawings will be generally familiar aspects, the mode of operation thereof will be nonetheless briefly discussed herein.

The fuel tank 1 is shown here in simplified form as being of approximately rectangular cross-section. It will be noted however that the fuel tank can be of many different configurations involving different filling levels and entailing different planes and compartments in the tank. Usually, suction jet pumps are provided in fuel tanks to ensure that fuel is continuously conveyed from the main body or compartment of the fuel tank 1 into the surge or swirl pot 4 from which fuel is fed to the fuel pump, so as to ensure that the surge or swirl pot 4 is continuously filled with fuel and thus also to ensure a constant supply of fuel to the fuel pump and thus the engine of the motor vehicle. A drive jet which can be formed by a flow of fuel taken from the feed to the engine or the return from the engine is operable in the suction jet pump to produce a reduced pressure in the region of a flow constriction in the manner of a venturi nozzle. A suction conduit opens into the region of the narrowest flow cross-section of the venturi nozzle, or into a suction chamber disposed at that location. The reduced pressure in the venturi nozzle thus draws fuel into same from the suction conduit. In that region therefore the drive jet which is passed through the suction jet pump is combined with the flow of fuel which is drawn thereinto.

As already indicated above fuel tanks will mostly include a plurality of such suction jet pumps. In the case of a fuel delivery system which does not involve a return flow of fuel from the engine to the tank, as is shown herein without however limitation thereto, the drive jet of the suction jet pump is branched off the fuel feed 6 to the engine by way of a pressure regulating valve diagrammatically indicated at 23. Both the first suction jet pump 5 and also the second suction jet pump 15 are operated in parallel relationship by way thereof. The second suction jet pump 15 acts at its suction side on the bead removal container 10 by way of the check valve 14. The first suction jet pump 5 is operable to deliver fuel from the fuel tank 1 into the surge or swirl pot 4.

From the vent unit 9, only a single vent conduit 8b goes to a fuel vapor filter 24. Connected upstream of that portion of the vent valve 8b, in the vent unit 9 or in the bead removal container 10, is a valve referred to as a roll-over valve as indicated at 16. The roll-over valve 16 is in the form of a float-actuated valve and/or a gravity-actuated valve and seals off the entire system in the event of the motor vehicle rolling over, in that case more specifically the roll-over valve 16 responding in a gravity-actuated mode. The tank also has a safety valve which is diagrammatically indicated at 17 and which for example in the event of the fuel tank 1 being overfilled, with an unacceptable increase in pressure therein, permits venting of the tank, more specifically when the operational vent means 7 and also the refuelling vent valve 11 are in a closed condition.

The safety valve 17 is so arranged, in the installation position of the fuel tank 1 and the vent unit 9, that as far as possible the safety valve is disposed in the gas phase of the fuel when the operational vent means 7 are immersed in fuel and accordingly closed, in order thereby to ensure a venting effect even when the fuel tank 1 is in an extreme inclined position.

It will be seen from the drawings that the vent unit 9 is in the form of a functional unit for closing a fitting opening indicated at 18 in the upper wall of the fuel tank 1.

In the illustrated structure the fitting opening 18 is provided at the edge of the fuel tank 1, but alternatively it can also be arranged at a spacing from the edge and for example at a central position. The vent unit 9 is provided with an outwardly disposed cover closure 19 which carries the entire assembly comprising the bead removal container 10, the valve chamber 12 and the valves arranged therein, as a construction unit. The cover closure 19 bears with a cover flange 20 against the outer wall 21 of the fuel tank. The cover flange 20 can be secured as by welding to the tank wall 21.

Alternatively, to make it readily possible to replace the vent unit 9 if required the cover closure 19 can be braced with its cover flange 20 against the tank wall 21 for example by means of a union nut (not shown), with the interposition of at least one sealing means. The closure arrangement may also advantageously be of a configuration as is described in U.S. patent application Ser. No. 08/886001 (U.S. Pat. No. 6,332,555) to which reference is directed in respect of the full content thereof for the purposes of incorporating the disclosure of same into the present specification.

Finally, the drawings also show a pressure conduit which is indicated by reference 22 which ensures that the filler pipe 2 can be subjected to the action of a pressure by way of the vent unit 9 for diagnosis purposes, using on-board diagnostics for checking sealing integrity.

It will be noted that the drawings show the check valve 14 as being disposed outside the vent unit 9. It will be appreciated however that the check valve 14 may also be an integral component part of the vent unit 9.

It will be appreciated that the above-described embodiment of the invention has been set forth solely by way of example and illustration of the principles thereof and that various modifications and alterations may be made therein without thereby departing from the spirit and scope of the invention.

What is claimed is:

1. A fuel tank for a motor vehicle, comprising:
   at least one filling opening,
   at least one fuel delivery pump,
   at least one operational vent means,
   at least one refueling vent means,
   a fuel vapor filter having an upstream side,
   at least one vent conduit connecting the vent means to the fuel vapor filter,
   at least one bead removal container, and
   means connecting the bead removal container on the upstream side of the fuel vapor filter,
   wherein at least the bead removal container and the at least one refueling vent means are combined to form a functional unit in the form of a vent unit, wherein said vent unit is arranged within said fuel tank.

2. A fuel tank as set forth in claim 1 including means arranging the vent unit releasably and interchangeably in the fuel tank.

3. A fuel tank as set forth in claim 1
   wherein the fuel tank has a wall having a fitting opening and the vent unit is in the form of an insert means adapted to close the fitting opening in the wall of the fuel tank.

4. A fuel tank as set forth in claim 1
   wherein the fuel tank has a tank wall having
      an opening for receiving said vent unit, and including
         a cover closure on said vent unit and having a cover flange adapted to co-operate in sealing relationship with the tank wall.

5. A fuel tank as set forth in claim 4
   wherein said cover closure is a carrier means carrying said vent unit.

6. A fuel tank as set forth in claim 1 including
   at least one roll-over valve in said vent unit.

7. A fuel tank as set forth in claim 1 including
   at least one safety relief valve in said vent unit operable to permit emergency venting of the fuel tank when the operational and refueling vent means are closed.

8. A fuel tank as set forth in claim 1 including
   a plurality of said operational vent means, and
   at least one vent conduit connecting said operational vent means to said vent unit.

9. A fuel tank as set forth in claim 1 including
   a plurality of said operational vent means, and
   a plurality of vent conduits connecting said operational vent means to said vent unit.

10. A fuel tank as set forth in claim 1 including
    means for actively emptying the bead removal container into said fuel tank against a fall in level.

11. A fuel tank as set forth in claim 1 including
    means for actively emptying the bead removal container into said fuel tank when there is a relatively slight difference in level between the fuel filling level in the fuel tank and the liquid filling level in the bead removal container.

12. A fuel tank as set forth in claim 1 including
    a pump having a suction intake side, and
    a drain conduit connecting said bead removal container to said suction intake side of said pump.

13. A fuel tank as set forth in claim 12
    wherein said pump is a suction jet pump.

14. A tank for a motor vehicle, comprising:
    a tank body comprising a wall with an opening therethrough,
    at least one filling opening,
    at least one fuel delivery pump,
    at least one operational vent means, at least one refueling vent means, at least one fuel bead removal container in the form of an insert having a cover flange closing the opening in a wall of said fuel tank in sealing relationship with said wall, at least one conduit means connecting the at least one operational vent means and the at least one refueling vent means to the bead removal container, a fuel vapor filter having an intake and a vapor discharge, and means connecting the bead removal container to the intake of the fuel vapor filter.

15. A vent unit for installation within a fuel tank having a wall and fuel vapor filter wherein said fuel tank contains operational vent means including:

at least one bead removal container, at least one refueling vent valve, vent conduits connected from said operational vent means of the fuel tank, vent conduits connected to a fuel vapor filter wherein the vent unit is in the form of an insert adapted to be fitted into the wall of said fuel tank.

16. A vent unit as set forth in claim 15 wherein the vent unit includes a cover closure with a cover flange adapted to co-operate in sealing relationship with the fuel tank wall.

17. A vent unit as set forth in claim 15 wherein said cover closure is in the form of a carrier means for carrying said vent unit.

18. A vent unit as set forth in claim 15 including at least one roll-over valve in said vent unit.

19. A vent unit as set forth in claim 15 including at least one safety pressure relief valve operable to permit emergency venting of the fuel tank when the vent means are closed.

* * * * *